United States Patent [19]

Morgan

[11] Patent Number: 4,511,090
[45] Date of Patent: Apr. 16, 1985

[54] MATERIAL SPREADER

[75] Inventor: Paul M. Morgan, Middletown, Ohio

[73] Assignee: Lakeshore Equipment & Supply Co., Elyria, Ohio

[21] Appl. No.: 485,029

[22] Filed: Apr. 14, 1983

[51] Int. Cl.³ .............................................. A01C 17/00
[52] U.S. Cl. ..................................... 239/666; 239/687
[58] Field of Search ................. 239/665, 666, 685, 687

[56] References Cited

U.S. PATENT DOCUMENTS

| | | | |
|---|---|---|---|
| 2,661,955 | 12/1953 | Sherer | 239/685 X |
| 2,841,401 | 7/1958 | Mascaro | 239/665 X |
| 3,420,452 | 1/1969 | Vaughan | 239/666 X |
| 3,559,894 | 2/1971 | Murray et al. | 239/687 X |
| 3,703,260 | 11/1972 | Grabske | 239/666 |

Primary Examiner—Jeffrey V. Nase
Assistant Examiner—Daniel R. Edelbrock
Attorney, Agent, or Firm—Yount & Tarolli

[57] ABSTRACT

The present invention relates to a rotary spreader where material is deposited on a rotary disc and is broadcast upon rotation of the disc as the spreader is moved. The present invention is directed to a jet action deflector which is used with the rotatable disc. The jet action deflector functions to intercept the material which is broadcast by the rotatable disc, which material would normally be directed to one side of the spreader, and redirect that material across the front of the spreader and to the other side of the spreader. The intercepted material is effectively shot at high velocity by the jet action deflector across the front of the spreader to the opposite side of the spreader. As a result, this material is spread over a wide area of the turf and is not concentrated in any particular area. The deflector may be used to prevent spreading of material on a driveway or sidewalk when the rotary spreader is being used adjacent the driveway or sidewalk.

9 Claims, 9 Drawing Figures

MATERIAL SPREADER

BACKGROUND AND SUMMARY OF THE INVENTION

This invention relates to a material spreader and, more particularly, to a material spreader of the rotary type used for broadcasting fertilizers, seeds, or other material in particulate form onto the ground or turf.

Two types of material spreaders are in widespread use today. One type is a drop spreader in which the material is discharged by gravity in a pattern whose dimensions conform to those of the discharge openings of the spreader. The second type is a rotary spreader in which the material is cast beyond the spreader to cover an area much wider than the dimensions of the spreader.

Drop spreaders, as is well known, produce a controlled distribution pattern. Rotary spreaders do not produce a controlled distribution pattern; however, they offer the advantage of speed of application, due to their wide swath of distribution. With rotary spreaders, feathering of the particulate material occurs at the edges of the distribution pattern. The feathering or progressively less dense distribution of particulate material as the pattern extends from the spreader permits overlap between successive swaths of distribution and thus a certain amount of error in spreader location can occur without a streaking problem which frequently occurs with drop spreaders.

Rotary spreaders push more easily than drop spreaders and are better suited to the use of corrosion resistant materials. Rotary spreaders also have the advantage of using only a few large exit ports from the material hopper for distribution of the particulate material rather than a series of small ports, thus accommodating larger particle sizes.

Rotary spreaders have one disadvantage that is well known. Specifically, if the spreader is used adjacent a driveway, sidewalk or the like, the particulate material being spread may be dispersed onto the sidewalk, or driveway. As a result, material is wasted unnecessarily. Also, it is difficult with a rotary spreader to prevent the material being broadcast from coming into contact with vegetation which is adjacent the area which is to receive the material. This problem has been solved in two ways. On rotary spreaders which have plural valved openings through which material drops from the hopper onto the rotary disc/impeller, it has been proposed to close one of the openings and thereby restrict distribution of material to an area of the impeller. The thought is that the impeller will then throw the material to only one side of the spreader. This has not been an effective solution. Also, rotary spreaders have been provided with deflectors which are movable into the path of the material being spread and intercept the material so that the material will not be distributed onto the sidewalk, driveway, vegetation or the like. Such deflectors, however, have had a major disadvantage of causing the material which is intercepted to form in a concentrated manner on the turf with adverse effects on the turf, such as burning if fertilizer is being distributed.

The present invention is specifically directed to a deflector for use on rotary-type spreaders. The deflector of the present invention is constructed so that the material may be accurately broadcast in a pattern without being deposited, for example, on a driveway, sidewalk, etc. and without an excessive deposit of material in any particular area. In fact, the deflector of the present invention intercepts material being broadcast by the rotary disc and causes the material to be broadcast in a pattern having a straight line along one side of the spreader and causes material that would have been broadcast beyond that line to be broadcast on the turf in front of the spreader and to the side of the spreader opposite the side where the deflector is located.

Specifically, the deflector of the present invention is movable into a position radially adjacent the rotatable disc of the rotary spreader. The deflector has a surface which curves around the rotatable disc and also has a nose portion which directs the material at a relatively high velocity across the front of the spreader and to the side of the spreader opposite the side where the deflector is mounted. The deflector, of course, prevents the material from being spread in a direction laterally to the side of the spreader on which the deflector is mounted. The deflector directs the material at a relatively high velocity across the front of the spreader and to the opposite side of the spreader. Certain structural features of the deflector contribute to the high velocity spreading of the material. These include (1) the angle of the forward or nose portion of the deflector relative to the base portion thereof and/or the angle of the nose portion relative to the direction of spreader movement, and (2) the curved internal surface of the deflector against which the particles being spread impinge.

The deflector of the present invention is movable vertically from a position located above the rotary distributor disc to a position radially adjacent the disc. When the deflector is located in a position above the rotary disc, it does not deflect or change the direction of the material which is broadcast by the disc, and therefore the spreader operates in a conventional fashion as any rotary spreader distributing particulate material to the opposite sides of the spreader. When the deflector is moved downwardly into a position radially adjacent the disc, the material which is distributed to the one side of the spreader is intercepted by the deflector and its direction of distribution is changed by the deflector. Specifically, the material impinges the interior surface of the deflector. The material rebounds from the surface and is directed through the forward nose portion of the deflector. The velocity of the material as it rebounds from the surface is sufficient to cause the material to be broadcast to the side of the spreader a substantial distance opposite the side where the deflector is mounted.

BRIEF DESCRIPTION OF THE DRAWINGS

Further features and advantages of the present invention will be apparent to those skilled in the art to which it relates from the following detailed description of a preferred embodiment thereof made with reference to the accompanying drawings in which.

DESCRIPTION OF PREFERRED EMBODIMENT

As noted hereinabove, the present invention relates to a rotary spreader, and, in particular, the present invention relates to a rotary spreader where material is deposited on a rotary disc and is broadcast upon rotation of the disc as the spreader is moved. The specific structure of the rotary spreader is not pertinent to the present invention. Specifically, the spreader may take a variety of forms. The present invention primarily is directed to a jet action deflector which is used with the rotatable disc. The jet action deflector functions to intercept the material which is broadcast by the rotatable disc and which material would normally be directed to one side of the spreader, and redirects that material across the front of the spreader and to the other side of the spreader. In fact, the intercepted material is effectively shot at high velocity by the jet action deflector across the front of the spreader to the opposite side of the spreader. As a result, this material is spread over a wide area of the turf and is not concentrated in any particular area.

Figure 1:
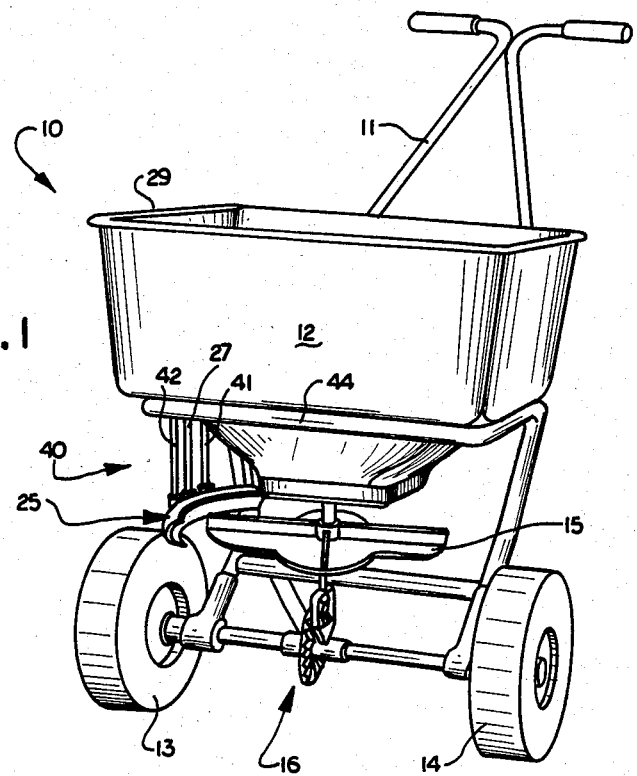
FIG. 1 is a perspective view of a rotary spreader embodying the present invention.

The present invention is shown applied to a spreader designated 10 (FIG. 1). The spreader 10 is of the rotary type. The spreader 10 includes a handle 11 which is manually engaged and used to push the spreader 10 along the turf. The spreader 10 also includes a hopper 12 into which material to be broadcast by the spreader is placed. The spreader, of course, has wheels 13, 14 which engage the turf on which the spreader is moved.

The spreader 10 includes a rotary disc 15 located centrally beneath the hopper 12. A suitable drive 16, as is known, rotates the disc when at least one of the wheels 13, 14 is rotated. Thus, the disc 15 rotates when the spreader 10 is pushed along the ground.

The rotary disc 15 is located so as to receive material which is dropped from the hopper 12 onto the disc. The hopper 12 specifically is provided with a valve plate or plates, not shown, in the bottom thereof as is well known, and which is operated to allow material to be dropped from the hopper 12 onto the rotary disc. When the material is dropped onto the rotary disc 15, the material is broadcast laterally by the rotary disc 15. In order to facilitate the distribution of the material, the rotary disc 15 is provided with ribs, not shown, for distributing the material radially of the spreader.

Also, as is known, the rotary disc 15 broadcasts the material which is contained in the hopper 12 laterally beyond the extent of the spreader. It is wasteful for the material to be broadcast laterally beyond the spreader if the area laterally beyond the spreader is a sidewalk or the like. Also, if vegetation is located in the area which would be damaged by the material being broadcast, the material should be positively prevented from contacting the vegetation.

In accordance with the present invention, the spreader 10 is provided with a jet action deflector, generally designated 25, for preventing the material from being broadcast laterally of the spreader onto a sidewalk, driveway, vegetation, or the like. The defelector 25 is located on one side of the spreader and directs the material to the turf in front of the spreader and to the side of the spreader opposite the side where the deflector is located.

Figure 7:
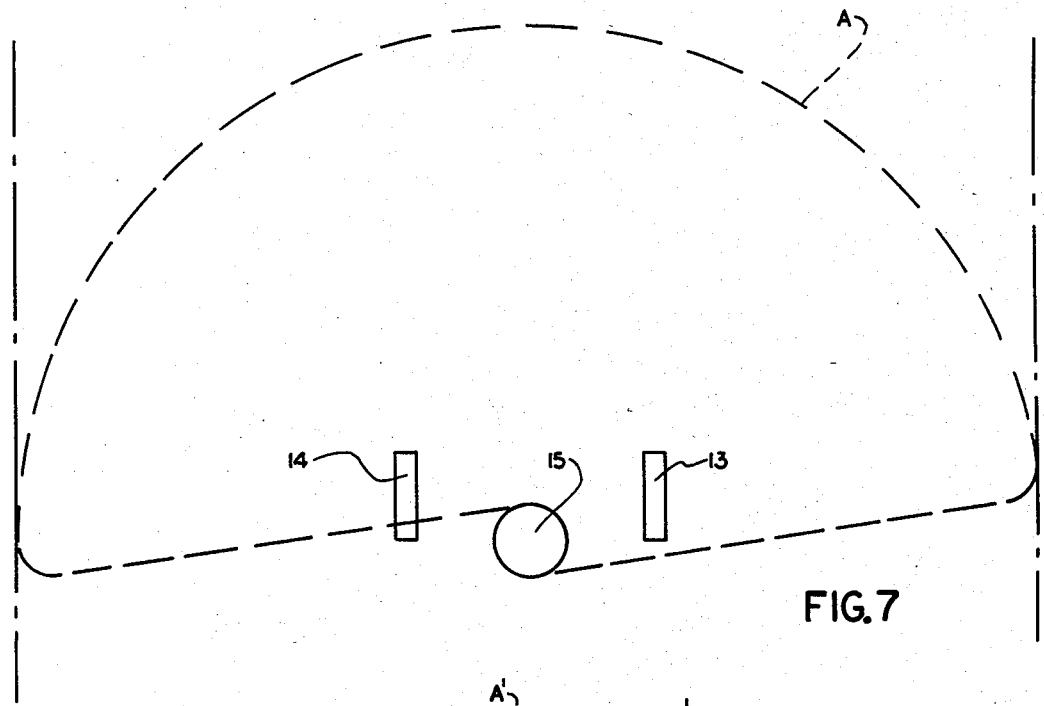
FIGS. 7 and 8 are respective schematic views showing the distribution pattern of the spreader with the deflector spaced from the rotary disc and with the deflector located in position adjacent the rotary disc.
Figure 9:
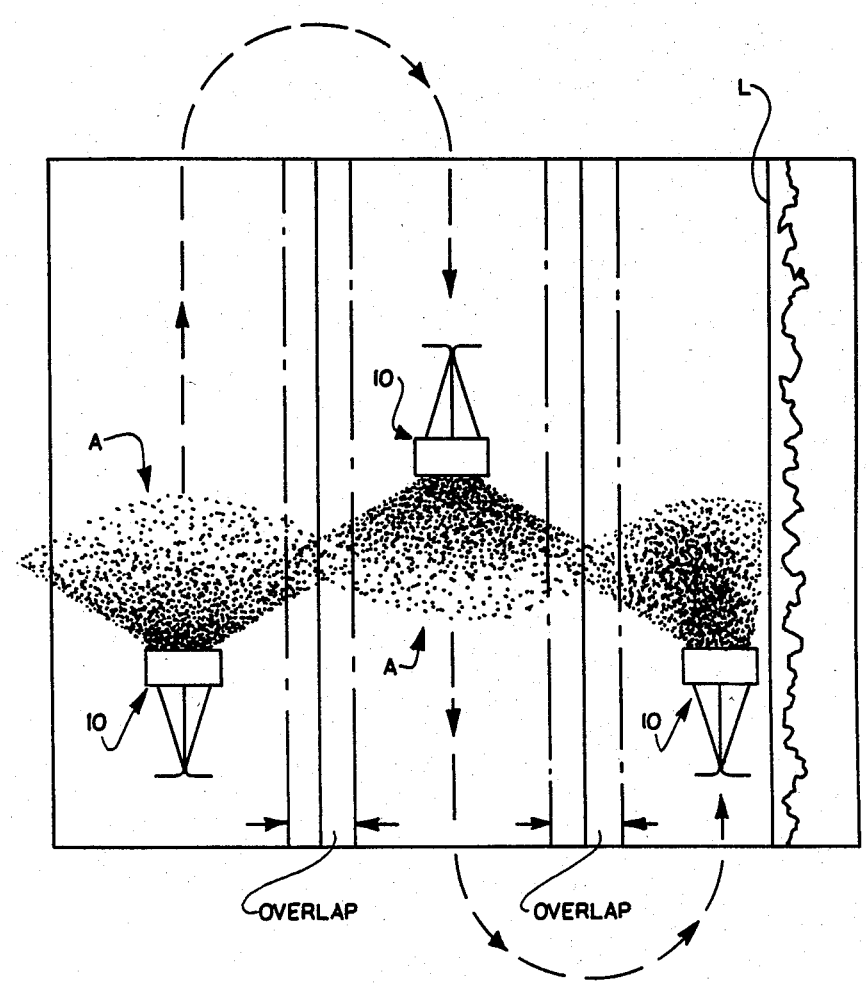
FIG. 9 is a further schematic view illustrating the operation of a spreader embodying the present invention.

The deflector 25 is a member of generally U-shaped cross section. The deflector member 25 is attached to a strap 27 which extends vertically. The strap 27 has an upper end with a U-configuration 28. The U-configuration 28 is adapted to extend over the edge 29 of the hopper 12. When the U-configuration 28 at the upper end of the strap 27 is located over the edge of the hopper 12, the deflector 25 is located in the dotted line position shown in FIG. 2 and is not radially adjacent the rotary disc 15. As a result, when the deflector is in this position, the material which is being distributed will be broadcast laterally to the opposite sides of the spreader. The distribution of the material is such that the farther from the hopper the material is broadcast, the less the density of the material on the turf. As shown in FIG. 9, the area designated as overlapped is the outer perimeter of the area covered by movement of the spreader in a given direction. Thus, movement of the spreader in both directions will cause distribution of material in the area designated overlap. The distribution pattern is shown in dotted lines in FIG. 7 and is designated A.

Figure 2:
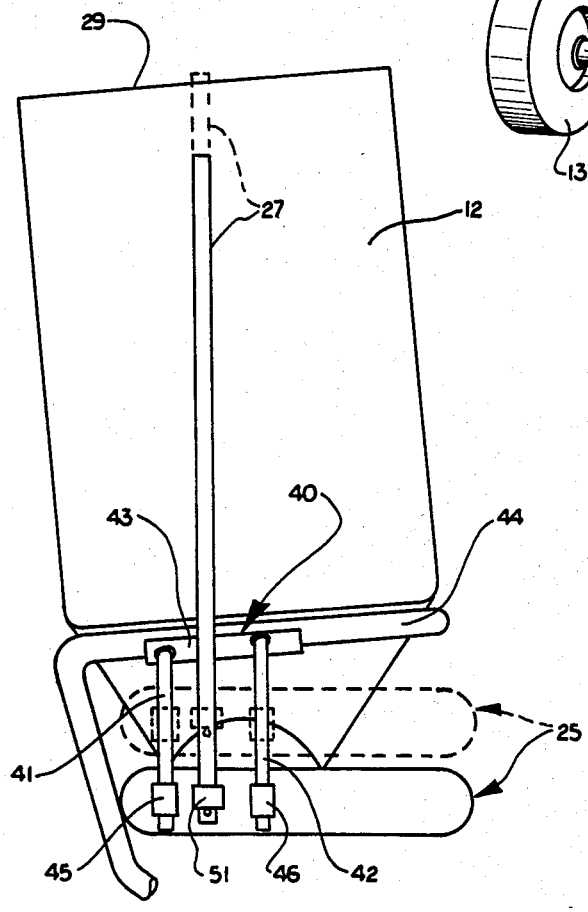
FIG. 2 is a fragmentary side view of the spreader of FIG. 1 showing the deflector thereof in two different positions.
Figure 3:
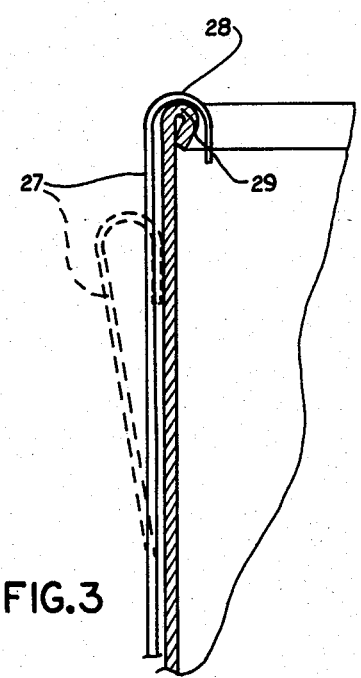
FIG. 3 is a further fragmentary view of the spreader of FIG. 1 showing parts thereof in two different positions.

If it is desired to prevent the material from being broadcast to one side of the spreader, namely, to the right side as the spreader is moving in a forward path, the U-shaped portion 28 of the strap 27 is removed from the edge 29 and the strap 27 is allowed to drop downwardly, which moves the deflector 25 from the dotted line position shown in FIG. 2 to the full line position shown in FIG. 2. The strap 27 is made of flexible steel material which enables the strap to be deformed to allow the strap to move downwardly.

When in the full line position shown in FIG. 2, the deflector 25 is located radially adjacent the rotary disc 15. The vertical movement of the deflector is guided by a guide, generally designated 40. The guide 40 comprises a pair of vertical pins 41, 42 which extend downwardly from a base portion 43. The base portion 43 is attached to a suitable support 44 of the hopper 12. The support 44 is a conventional support of the spreader 10 and is not a special support.

Figure 4:
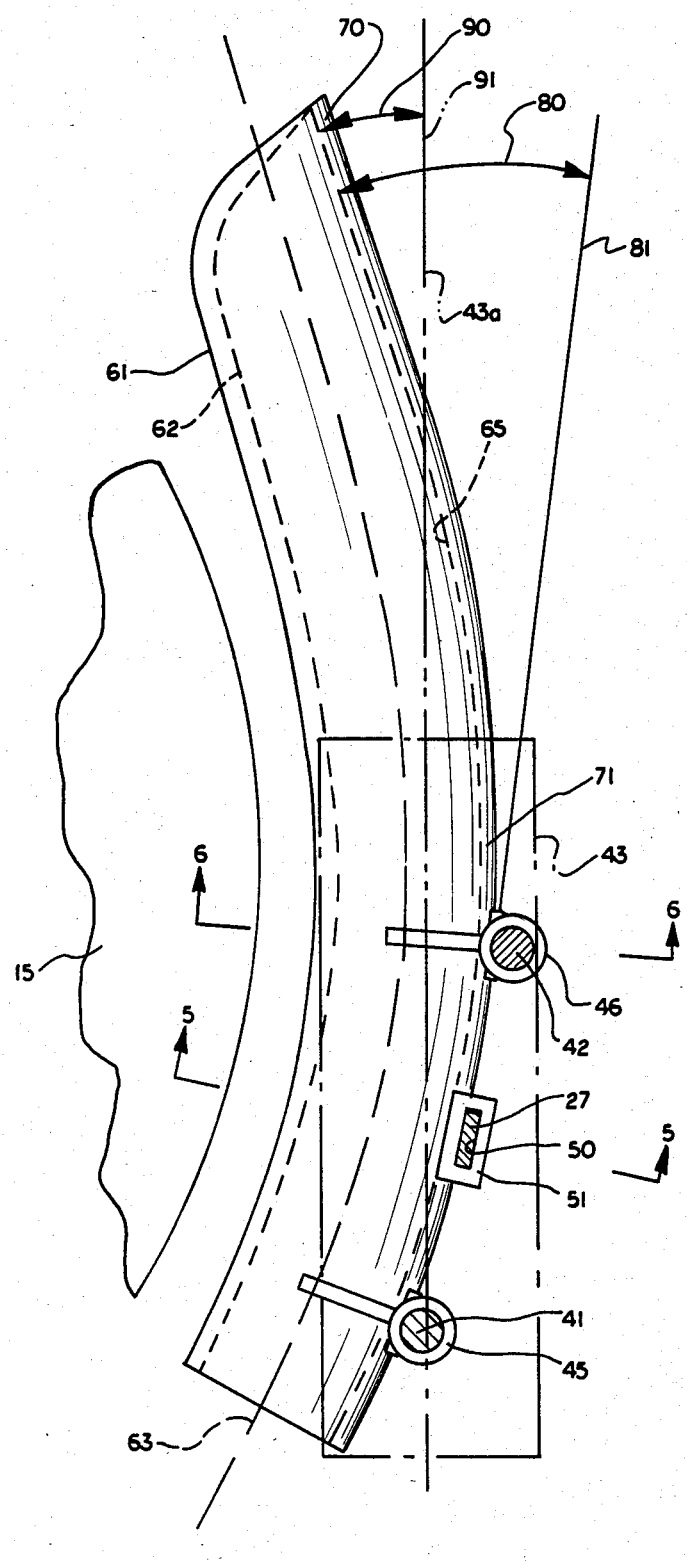
FIG. 4 is a somewhat schematic plan view showing the deflector in a position adjacent the rotary disc of the spreader.

The guide pins 41, 42 are slidably received in openings in bosses 45, 46 which are formed on the deflector member 25. At the lower end of each of the pins 41, 42 there is a suitable spring clip 47 (see FIG. 6) which limits the downward movement of the deflector 25 relative to the guide pins 41, 42. As best shown in FIG. 4, the guide pins 41, 42 are laterally offset relative to each other and relative to the axis 43a of the base part 43 of the guide 40.

The strap 27 for vertically moving the tubular deflector 25 is attached to the deflector 25 by a suitable fastening device. In particular, the strap device 27 extends through an opening 50 formed in a boss 51 in the deflector member 25. At the lower end of the strap 27, there is a suitable retaining device, such as a cotter pin or spring clip 52. The cotter pin 52 prevents the defletor 25 from being removed from the strap 27 and causes the deflector 25 to be moved vertically with the strap 27.

Figure 5:
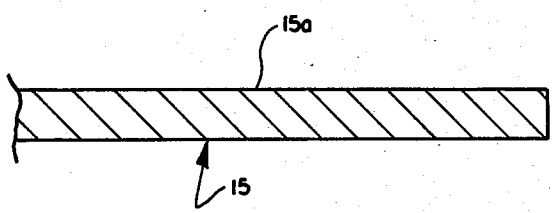
FIG. 5 is a cross-section taken approximately along the line 5—5 of FIG. 4.
Figure 5:
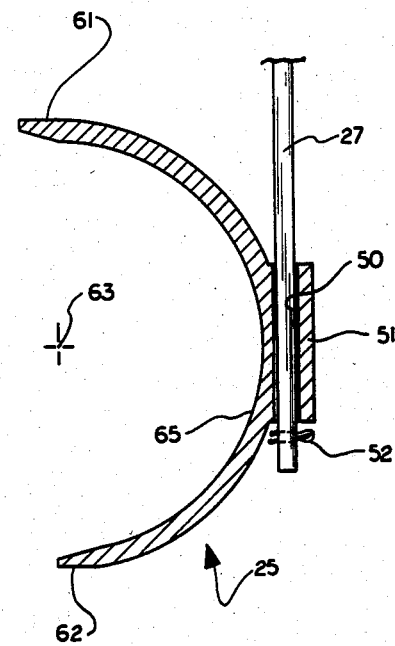
Figure 6:
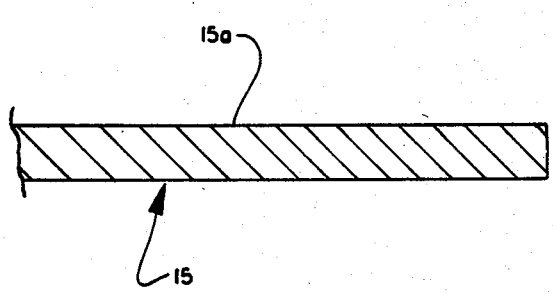
FIG. 6 is a cross-section taken approximately along the line 6—6 of FIG. 4.
Figure 6:
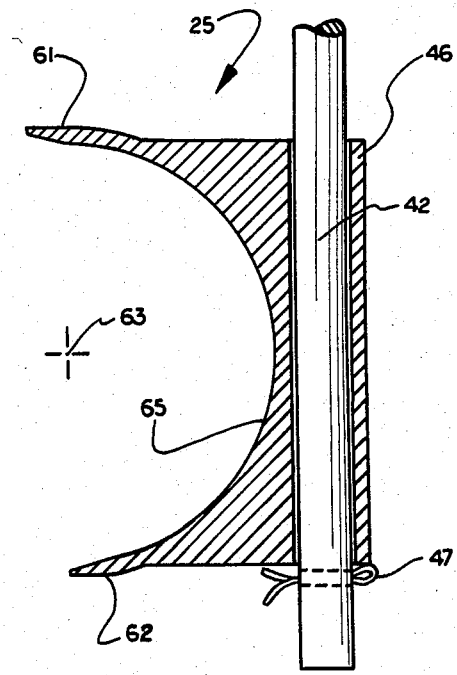

The deflector 25, as described above, comprises a generally U-shaped member. The deflector 25 is an integrally molded plastic part. The U opens laterally toward the rotary disc 15. Specifically, the deflector 25 has an upper wall portion 61 and a lower wall portion 62. The central axis of the tubular member 25 is designated 63 and best shown in FIG. 4. The axis 63 is curved about the axis of the disc 15. Also, when the deflector 25 is located in a downward position, the upper surface 15a of the rotary disc 15 is located in a plane which is adjacent the lower wall portion 62 of the deflector member 25, as best shown in FIGS. 5, 6. In fact, the upper surface of the rotary disc is spaced below the central axis 63 of the deflector member 25.

The material which is broadcast outwardly by rotation of the disc 15 moves outwardly and impinges on a curved surface 65 of the deflector 25. The surface 65 is curved not only in a direction circumferentially of the disc 15, but also is curved in a direction transverse to the upper surface of the disc 15. Further, the upper wall portion 61 of the tubular member 25 projects radially inwardly toward the disc farther than the lower wall portion 62. This minimizes material from being broadcast to the side of the spreader over the top of the deflector 25.

Figure 8:
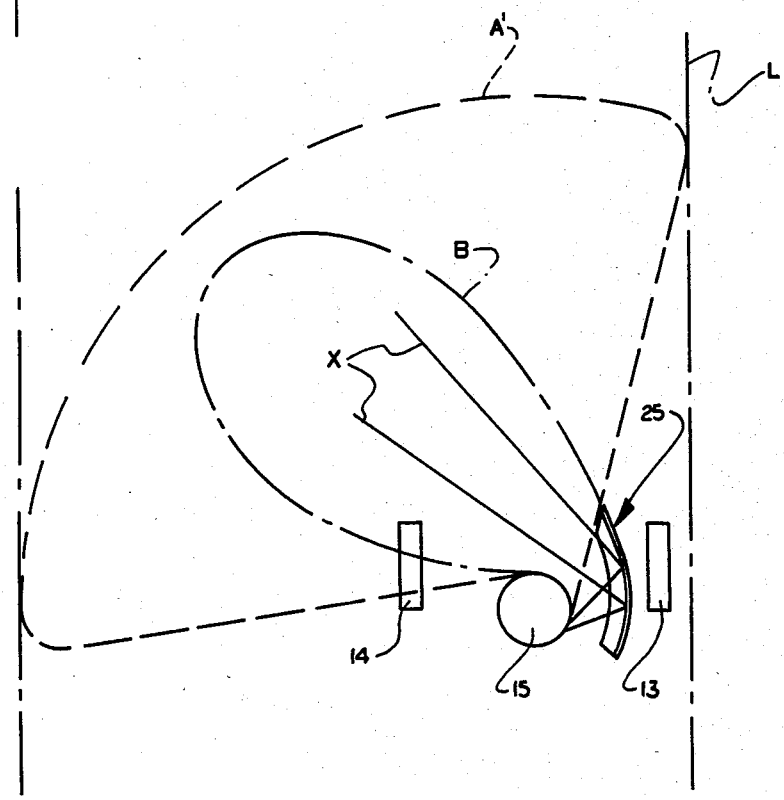

The material as it is broadcast radially outwardly by the disc 15 impinges with substantial force against the surface 65 of the deflector member 25. As a result, the material rebounds off the surface 65 of the tubular member 25 in a direction which extends at an angle to the path of movement of the spreader. This is illustrated by the lines designated X in FIG. 8. The rebounding action is such that there is a substantial component of force causing the material to be broadcast onto the turf in front of the spreader and to a substantial distance to the side of the spreader. In fact, material is distributed by the jet action deflector 25 in a pattern which is generally designated by the area B in FIG. 8, whereas the area A' in FIG. 8 is an area of distribution which is created by the broadcast of the material due to rotation of the disc 15. As shown at the right in FIG. 9, the material is spread over an area in front of the spreader and to one side of the spreader. The result of the action of the deflector 25 is that material is distributed in a pattern which is bounded on one side by a straight line, indicated by a line L in FIGS. 8 and 9.

The curvature of the surface 65 of the deflector 25 in a direction transverse to the plane of rotation of the disc 15 is such that the material which impinges upon the surface 65 is reflected in a pattern which is substantially vertically concentrated. This helps to deflect the material at high velocity across the side of the spreader 10 opposite from the deflector 25.

Accordingly, with the deflector 25 located adjacent disc 15 the spreader can be used to distribute material in such a manner that it would not be distributed onto a sidewalk, vegetation, or driveway unnecessarily. Also, the distribution pattern is such that there is no concentration of material in any particular area of the turf. Specifically, the deflector 25 effects a distribution of the material onto the turf in front of the spreader and also for a substantial distance along the side of the spreader opposite the side where the deflector 25 itself is mounted. Thus, there is no concentrating of the material being distributed in any particular area on the turf.

The deflector 25 has a nose portion 70 from which the material exits from the deflector 25. The deflector 25 also has a base portion 71. The base portion 71 has the bores which receive the pins 41, 42. In plan view the base portion 71 is curved as shown in FIG. 4. Also, the base portion 71 is located adjacent the rotating disc 15 whereas the nozzle portion 70 is located forwardly of the disc 15.

The surface 65 in nose portion 70 forms an angle 80 with a tangent 81 to the base portion 71 of the deflector 25, see FIG. 4.

The angle 80 is approximately 26 degrees. If the angle 80 were substantially greater, for example, 90 degrees, obviously the material would not be spread across the front and to the side of the spreader opposite the side where the deflector is mounted. In fact, the material would lose its momentum in attempting to traverse the deflector. The material would drop primarily directly vertically downwardly, and thus a concentrated area of material would be provided on the turf. Also, obviously, if the angle 80 were too small, the material would impact against the deflector and drop vertically downwardly and thus concentrate in an area along a line such as L.

Also, the surface 65 in the nozzle portion 70 of the deflector 25 of the present invention forms an angle 90 with the direction of movement of the spreader. The intended direction of spreader movement is indicated in FIG. 4 as line 91 which coincides with axis 43a. This angle is on the order of 19 degrees.

Having described my invention, I claim:

1. In a spreader for particulate material adapted to be advanced in a given direction and having discharge means for discharging the particulate material downwardly from the spreader and a rotary distributor in association with the discharge means for broadcasting the discharged material outwardly of the spreader, a particulate material deflector means on one side of the spreader and movable between first and second positions, said deflector means being located radially adjacent said rotary distributor when in said first position to intercept material broadcast by said rotary distributor and being spaced from said first position so as not to intercept material broadcast by said rotary distributor when in said second position, said deflector means having a surface against which the material broadcast by said distributor impinges when said deflector means is in said first position, and said deflector means having a nose end portion for directing the intercepted material across the front of the spreader and to the side of the spreader opposite that side where the deflector is located, said surface against which the material broadcast by said rotary distributor impinges comprising a surface which is curved in a direction circumferentially of said rotary distributor.

2. A spreader as defined in claim 1 wherein said surface is curved in a direction transverse to the plane of rotation of said rotary distributor.

3. A spreader as defined in claim 1 further including means supporting said deflector means for movement between said first and second positions, said means supporting said deflector means comprising a guide bracket having means slidably engaging said deflector means to slidably guide the movement of the deflector means vertically between said first and second positions.

4. A spreader as defined in claim 3 wherein said guide bracket comprises a pair of vertically extending pin members slidably received in openings formed in bosses of said deflector means.

5. In a spreader for particulate material adapted to be advanced in a given direction and having discharge means for discharging the particulate material downwardly from the spreader and a rotary distributor in association with the discharge means for broadcasting the discharged material outwardly of the spreader, a particulate material deflector means on one side of the spreader and movable between first and second positions, said deflector means being located radially adjacent said rotary distributor when in said first position to intercept material broadcast by said rotary distributor and being spaced from said first position so as not to intercept material broadcast by said rotary distributor when in said second position, said deflector means having a surface against which the material broadcast by said distributor impinges when said deflector means is in said first position, and said deflector means having a nose end portion for directing the intercepted material across the front of the spreader and to the side of the spreader opposite that side where the deflector is located, said deflector means comprising an integrally molded one-piece plastic part which is of generally U-shaped configuration with a U-shaped opening toward said rotary distributor.

6. A spreader as defined in claim 5 or 1 wherein said nose end portion of said deflector means is formed at an angle of approximately 19 degrees to the direction of movement of the spreader.

7. A spreader as defined in claim 6 wherein said deflector means includes a base portion attached to said nose end portion, said base portion forming an angle of approximately 26° with said nose end portion.

8. In a spreader for particulate material adapted to be advanced in a given direction and having discharge means for discharging the particulate material downwardly from the spreader and a rotary distributor in association with the discharge means for broadcasting the discharged material outwardly of the spreader, a particulate material deflector means on one side of the spreader and movable between first and second positions, said deflector means being located radially adjacent said rotary distributor when in said first position to intercept material broadcast by said rotary distributor and being spaced from said first position so as not to intercept material broadcast by said rotary distributor when in said second position, and said deflector means having a nose end portion for directing intercepted material onto the turf and a curved base portion, said nose end portion extending at an angle of approximately 19° to the direction of movement of the spreader, and said nose end portion forming an angle with said curved base portion of approximately 26°.

9. A spreader as defined in claim 8 wherein said curved base portion defines, at least, in part a surface against which the material broadcast by the distributor impinges, said surface being curved in a direction transverse to the plane of rotation of the rotary distributor as well as circumferentially of said rotary distributor.

* * * * *